United States Patent
Zhang

(10) Patent No.: US 11,556,756 B2
(45) Date of Patent: Jan. 17, 2023

(54) COMPUTATION GRAPH MAPPING IN HETEROGENEOUS COMPUTER SYSTEM

(71) Applicant: ALIBABA GROUP HOLDING LIMITED, Grand Cayman (KY)

(72) Inventor: Weifeng Zhang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 937 days.

(21) Appl. No.: 16/394,921

(22) Filed: Apr. 25, 2019

(65) Prior Publication Data

US 2020/0342286 A1 Oct. 29, 2020

(51) Int. Cl.
*G06F 7/04* (2006.01)
*G06N 3/04* (2006.01)
*G06F 9/50* (2006.01)
*G06F 16/901* (2019.01)

(52) U.S. Cl.
CPC .............. *G06N 3/04* (2013.01); *G06F 9/5038* (2013.01); *G06F 16/9024* (2019.01)

(58) Field of Classification Search
CPC ...... G06N 3/04; G06F 16/9024; G06F 9/5038
See application file for complete search history.

(56) References Cited

U.S. PATENT DOCUMENTS

| | | | |
|---|---|---|---|
| 2011/0258617 A1* | 10/2011 | Park | G06F 11/3612 717/157 |
| 2012/0139921 A1* | 6/2012 | Marshall | G06T 17/20 345/428 |
| 2014/0196007 A1 | 7/2014 | Pointer et al. | |
| 2014/0289733 A1* | 9/2014 | Fritz | G06F 9/5066 718/104 |
| 2017/0132513 A1 | 5/2017 | Yu et al. | |
| 2020/0035002 A1* | 1/2020 | Epasto | G06T 9/00 |
| 2020/0125898 A1* | 4/2020 | Zuev | G06V 30/40 |

OTHER PUBLICATIONS

Huang et al., "GPipe: Efficient Training of Giant Neural Networks using Pipeline Parallelism," arXiv:1811.06965v4 [cs.CV] Dec. 12, 2018, 11 pages.

(Continued)

*Primary Examiner* — Hang Pan
(74) *Attorney, Agent, or Firm* — Finnegan, Henderson, Farabow, Garrett & Dunner LLP

(57) ABSTRACT

The present disclosure relates to a method for scheduling a computation graph on heterogeneous computing resources. The method comprises generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph, adapting the augmented computation graph to include performance values for the edges, the replica nodes of the first set, and the replica nodes of the second set, and determining a path across the adapted computation graph via one replica node of the first set and one replica node of the second set based on the performance values.

17 Claims, 8 Drawing Sheets

(56) References Cited

OTHER PUBLICATIONS

Jang et al., "Exploiting Memory Access Patterns to Improve Memory Performance in Data-Parallel Architectures," IEEE Transactions on Parallel and Distributed Systems, vol. 22, No. 1, Jan. 2011, 14 pages.
PCT International Search Report in corresponding with PCT Application No. PCT/US2020/028492, dated Jul. 2, 2020 (3 pages).
Gallet et al. "Efficient Scheduling of Task Graph Collections on Heterogeneous Resources," 2009 IEEE International Symposium on Parallel & Distributed Processing, 2009, pp. 1-11.
Brooks, "Graph Optimization with NetworkX in Python." In: DataCamp. Sep. 12, 2017, Retrieved on Jun. 8, 2020 from <https://www.datacamp.com/tutorial/networkx-python-graph-tutorial>.
Chen, et al., "PowerLyra: Differentiated Graph Computation and Partitioning on Skewed Graphs," ACM Transactions on Parallel Computing (TOPC). Jan. 2019 (15 pages).
Wang et al., "HSIP: A Novel Task Scheduling Algorithm for Heterogeneous Computing," Scientific Programming. Feb. 16, 2016 (12 pages).

\* cited by examiner

COMPUTATION GRAPH MAPPING IN HETEROGENEOUS COMPUTER SYSTEM

BACKGROUND

Complexity of neural network models has been constantly increasing such that massive amount of computing power is required for neural network model training and inference. A typical machine-learning or deep-learning model may have thousands or even millions of variables and computation operations. Further, neural network model's behaviour has been diversified since its emergence. Traditional homogeneous computing architecture generally could not meet various computational needs for processing neural network models. To meet ever-growing needs for computing power and diversity and for better execution efficiency, various types of heterogeneous computing devices or accelerators for machine learning or deep learning have been developed. A heterogeneous platform including various accelerators that may not have equal processing performance has been used for machine learning applications. Therefore, how to assign computational tasks on various accelerators in a heterogeneous platform has been noted as important issues to improve neural network system's efficiency and overall performance.

SUMMARY

Embodiments of the present disclosure provide a method for scheduling a computation graph on heterogeneous computing resources. The method can comprise generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph, adapting the augmented computation graph to include performance values for the edges, the replica nodes of the first set, and the replica nodes of the second set, and determining a path across the adapted computation graph via one replica node of the first set and one replica node of the second set based on the performance values.

Embodiments of the present disclosure also provide an apparatus for scheduling a computation graph on heterogeneous computing resources. The apparatus can comprise a memory storing a set of instructions; and one or more processors configured to execute the set of instructions to cause the apparatus to perform: generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph; adapting the augmented computation graph to include performance values for the edges, the replica nodes of the first set, and the replica nodes of the second set; and determining a path across the adapted computation graph via one replica node of the first set and one replica node of the second set based on the performance values.

Embodiments of the present disclosure also provide a non-transitory computer readable medium that stores a set of instructions that is executable by at least one processor of a computing device to cause the computing device to perform a method for scheduling a computation graph on heterogeneous computing resources. The method can comprise: generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph; adapting the augmented computation graph to include performance values for the edges, the replica nodes of the first set, and the replica nodes of the second set; and determining a path across the adapted computation graph via one replica node of the first set and one replica node of the second set based on the performance values.

Each of the first set of replica nodes and each of the second set of replica nodes can be associated with at least one computing resource of the heterogeneous computing resources. A number of the replica nodes in the first set can correspond to a number of potential target devices for executing an operation of the first node in the heterogeneous computing resources. Here, the potential target devices can be selected from a plurality of target devices in the heterogeneous computing resources. Each of the replica nodes in the first set represents that the operation of the first node can be assigned to corresponding each of the potential target devices. The performance values can include a data transfer time corresponding to an edge among the edges and an execution time corresponding to a replica node among the replica nodes of the first set. The adapted computation graph can include an initial node and a final node that are added to a front end and an end of the augmented computation graph when adapting the augmented computation graph. The path can be determined based on comparison of sums of performance values along possible paths across the adapted computation graph.

The method can further comprise allocating target devices in the heterogeneous computing resources for executing an operation of the first node and an operation of the second node according to the determined path. Here, a target device corresponding to the one replica node of the first set can be assigned for executing the operation of the first node and a target device corresponding to the one replica node of the second set can be assigned for executing the operation of the second node.

DETAILED DESCRIPTION

Figure 1A:
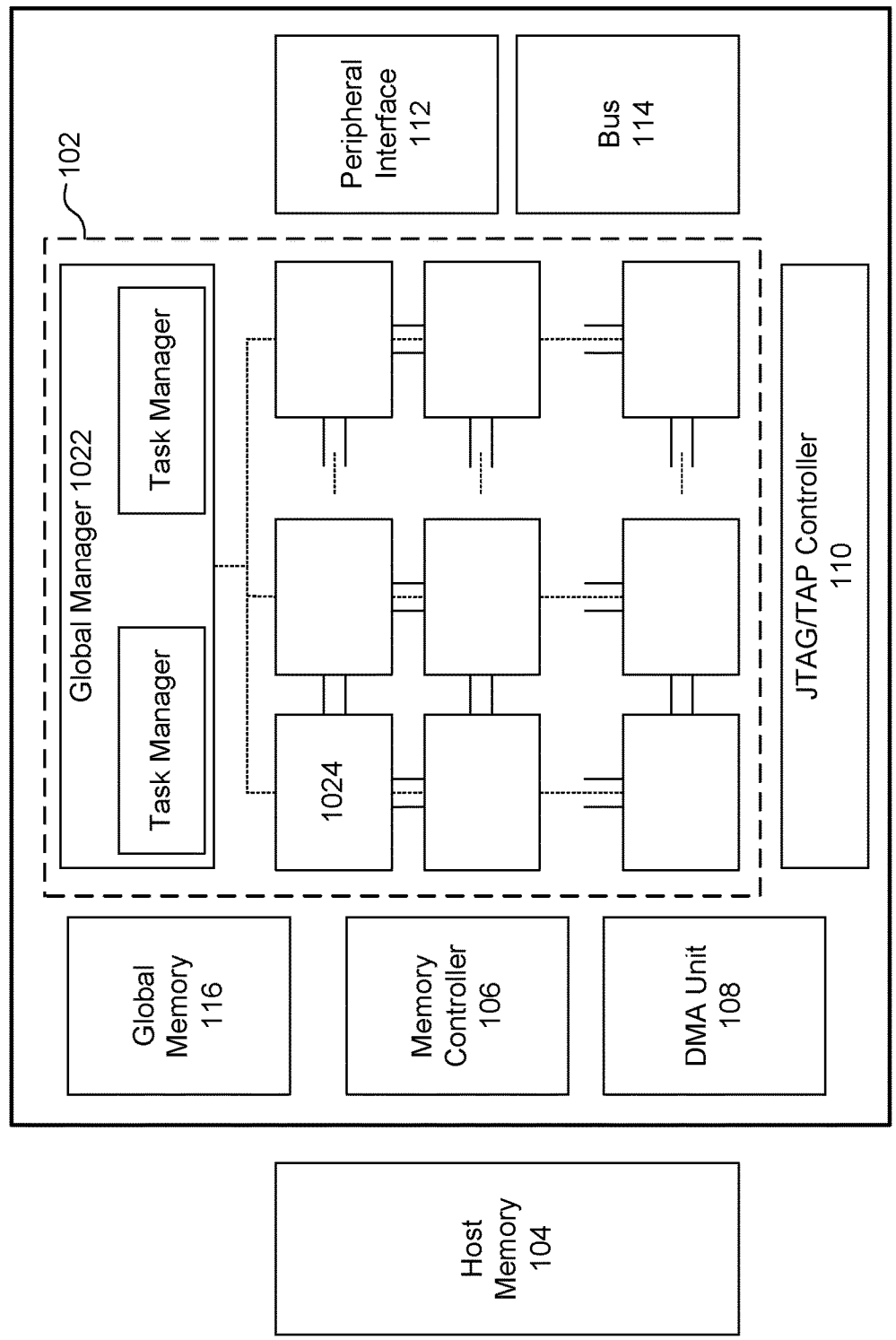
FIG. 1A illustrates an exemplary accelerator architecture, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

A computing system for machine learning may have a heterogenous platform. The heterogenous platform may include various accelerators such as GPUs, FPGAs, and ASICs, each of which can be used to process operations of a machine-learning or deep-learning model. The heterogeneous platform may include an accelerator in which processing elements do not have equal processing performance with each other. In machine learning or deep learning, a neural network model may be graphically represented by a computational graph or a data structure comprising nodes and edges organized as a directed acyclic graph (DAG) that describes how data is processed or transformed during training or inference. Nodes represent variables, weights, or computation operations, while edges represent data flow from one node to another node or dependency between two nodes.

In order to improve performance of executing a machine-learning model or deep-learning model, various optimizations can be performed on a computation graph including: 1) partitioning the computation graph into subsets for parallel execution, each of the subsets may include a single operation or a group of operations; 2) mapping the subsets on hardware acceleration logics that match behaviours of the corresponding subsets for maximizing execution efficiency; and 3) scheduling data transfer and computations so that their execution can be pipelined as much as possible. As a typical machine-learning or deep-learning model may have thousands or even millions of variables and computation operations, a single accelerator may not be able to handle its entirety. Therefore, a machine-learning or deep-learning model can be decomposed to subsets and mapped to multiple computing devices in a heterogeneous platform while execution parallelism is still achieved by coordinating execution of operations.

It is challenging how to divide a computation graph and to map each divided portion on a heterogenous platform. The disclosed embodiments provide techniques for scheduling a computation graph on a heterogeneous platform, which can improve performance and efficiency for executing a machine-learning model on the heterogeneous platform. The disclosed embodiments provide methods or apparatuses for partitioning a computation graph according to computational granularities of accelerators and map each partition on various accelerators for optimal performance. Here, accelerator's granularity can be a unit of an instruction, an operation, a neural network layer, or a neural network model. The disclosed embodiments can provide techniques for enabling design space exploration of hardware accelerator architecture having hardware-software co-optimized computation granularity by clustering operations together or breaking large operation into smaller operations to achieve optimal execution performance and efficiency.

FIG. 1A illustrates an exemplary neural network accelerator architecture 100, consistent with embodiments of the present disclosure. In the context of this disclosure, a neural network accelerator may also be referred to as a machine learning accelerator or deep learning accelerator. In some embodiments, accelerator architecture 100 may be referred to as a neural network processing unit (NPU) architecture 100. As shown in FIG. 1A, accelerator architecture 100 can include an on-chip communication system 102, a host memory 104, a memory controller 106, a direct memory access (DMA) unit 108, a Joint Test Action Group (JTAG)/Test Access End (TAP) controller 110, peripheral interface 112, a bus 114, a global memory 116, and the like. It is appreciated that on-chip communication system 102 can perform algorithmic operations based on communicated data. Moreover, accelerator architecture 100 can include a global memory 116 having memory blocks (e.g., 4 blocks of 8 GB second generation of high bandwidth memory (HBM2)) to serve as main memory.

On-chip communication system 102 can include a global manager 1022 and a plurality of cores 1024. Global manager 1022 can include at least one task manager to coordinate with one or more cores 1024. Each task manager can be associated with an array of cores 1024 that provide synapse/neuron circuitry for the neural network. For example, the top layer of cores of FIG. 1A may provide circuitry representing an input layer to neural network, while the second layer of cores may provide circuitry representing a hidden layer of the neural network. As shown in FIG. 1A, global manager 1022 can include two task managers to coordinate with two arrays of cores 1024.

Cores 1024 can include one or more processing elements that each includes single instruction, multiple data (SIMD) architecture including one or more processing units configured to perform one or more operations (e.g., multiplication, addition, multiply-accumulate, etc.) on the communicated data under the control of global manager 1022. To perform the operation on the communicated data packets, cores 1024 can include one or more processing elements for processing information in the data packets. Each processing element may comprise any number of processing units. In some embodiments, core 1024 can be considered a tile or the like Host memory 104 can be off-chip memory such as a host CPU's memory. For example, host memory 104 can be a double data rate synchronous dynamic random-access memory (e.g., DDR SDRAM) or the like. Host memory 104 can be configured to store a large amount of data with slower access speed, compared to the on-chip memory integrated within one or more processors, acting as a higher-level cache.

Memory controller 106 can manage the reading and writing of data to and from a specific memory block (e.g., HBM2) within global memory 116. For example, memory controller 106 can manage read/write data coming from an external chip communication system 102 (e.g., from DMA unit 108 or a DMA unit corresponding with another accelerator) or from on-chip communication system 102 (e.g., from a local memory in core 1024 via a 2D mesh controlled by a task manager of global manager 1022). Moreover, while one memory controller is shown in FIG. 1A, it is appreciated that more than one memory controller can be provided in accelerator architecture 100. For example, there can be one memory controller for each memory block (e.g., HBM2) within global memory 116.

Memory controller 106 can generate memory addresses and initiate memory read or write cycles. Memory controller 106 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 108 can assist with transferring data between host memory 104 and global memory 116. In addition, DMA unit 108 can assist with transferring data between multiple accelerators. DMA unit 108 can allow off-chip devices to access both on-chip and off-chip memory without causing a host CPU interrupt. Thus, DMA unit 108 can also generate memory addresses and initiate memory read or write cycles. DMA unit 108 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, and/or the number of bytes to transfer in one burst. It is appreciated that accelerator architecture 100 can include a second DMA unit, which can be used to transfer data between other accelerator architecture to allow multiple accelerator architectures to communicate directly without involving the host CPU.

JTAG/TAP controller 110 can specify a dedicated debug port implementing a serial communications interface (e.g., a JTAG interface) for low-overhead access to the accelerator without requiring direct external access to the system address and data buses. JTAG/TAP controller 110 can also have on-chip test access interface (e.g., a TAP interface) that implements a protocol to access a set of test registers that present chip logic levels and device capabilities of various parts.

Peripheral interface 112 (such as a PCIe interface), if present, serves as an (and typically the) inter-chip bus, providing communication between the accelerator and other devices.

Bus 114 includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. Typically, if there is a peripheral interface 112 (e.g., the inter-chip bus), bus 114 is solely concerned with intra-chip buses, though in some implementations it could still be concerned with specialized inter-bus communications.

While accelerator architecture 100 of FIG. 1A is generally directed to an NPU architecture (as further described below), it is appreciated that the disclosed embodiments may be applied to any type of accelerator for accelerating some applications such as deep learning. It is also appreciated that the disclosed embodiments can be applied to any accelerator such as a chip with SIMD architecture. Such accelerators can be, for example, GPU (Graphics Processing Unit), FPGA (Field Programmable Gate Array), ASIC (Application Specific Integrated Circuit) with vector or matrix processing ability, or other types of neural network accelerators for deep learning. SIMD or vector architecture is commonly used to support computing devices with data parallelism, such as graphics processing and deep learning. The SIMD architecture can include multiple processing elements, wherein each of the processing elements can perform the same operation on multiple data points simultaneously.

Figure 1B:
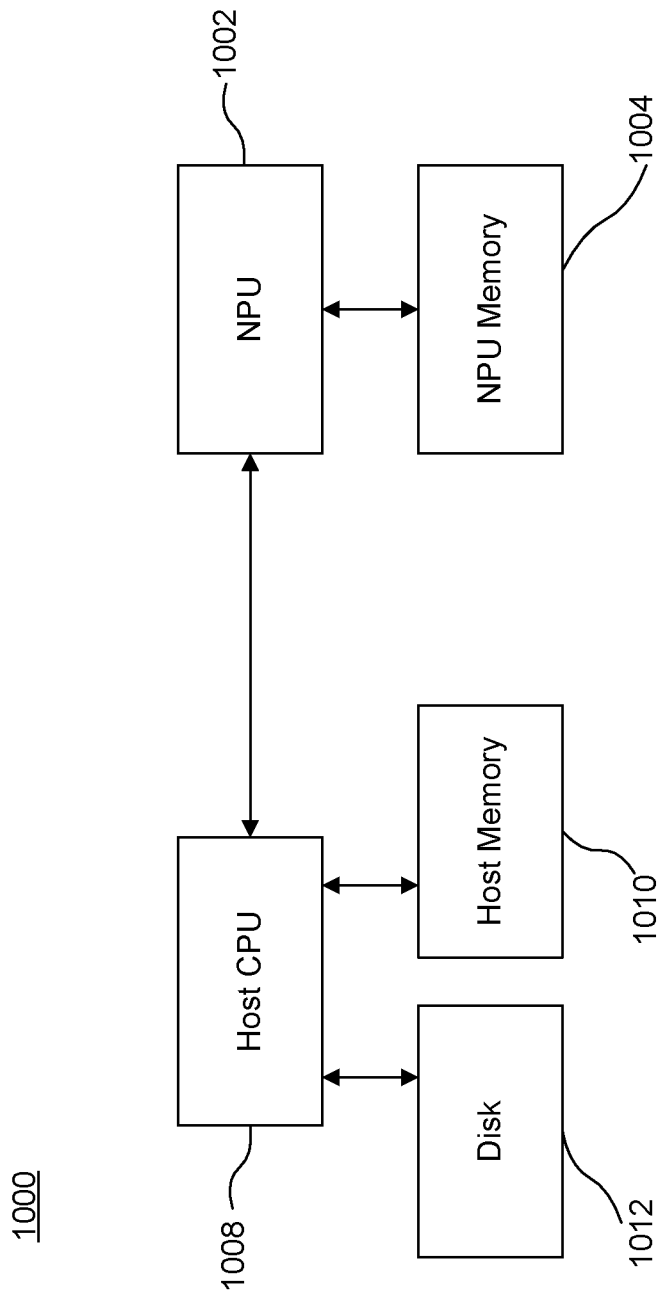
FIG. 1B illustrates an exemplary neural network accelerator system, consistent with embodiments of the present disclosure.

Reference is now made to FIG. 1B, which illustrates a block diagram of an exemplary neural network accelerator system 1000, consistent with embodiments of the present disclosure. Neural network accelerator system 1000 may include a neural network processing unit (NPU) 1002, an NPU memory 1004, a host CPU 1008, a host memory 1010 associated with host CPU 1008 (which may correspond to host memory 104 of FIG. 1A), and a disk 1012.

As illustrated in FIG. 1B, NPU 1002 may be connected to host CPU 1008 through a peripheral interface (e.g., peripheral interface 112 of FIG. 1A). As referred to herein, a neural network processing unit (e.g., NPU 1002) may be a computing device for accelerating neural network computing tasks. In some embodiments, NPU 1002 may be configured to be used as a co-processor of host CPU 1008.

In some embodiments, NPU 1002 may comprise a compiler (not shown). The compiler is a program or computer software that transforms computer code written in one programming language into NPU instructions to create an executable program. In machining applications, a compiler can perform a variety of operations, for example, pre-processing, lexical analysis, parsing, semantic analysis, conversion of input programs to an intermediate representation, code optimization, and code generation, or combinations thereof.

In some embodiments, the compiler may be on a host unit (e.g., host CPU 1008 or host memory 1010 of FIG. 1B), configured to push one or more commands to NPU 1002. Based on these commands, a task manager (e.g., task manager 102 of FIG. 1A) may assign any number of tasks to one or more cores or processing elements (for simplicity, cores shall be referred to hereinafter although the core can include multiple processing elements or be separate from processing elements). Some of the commands may instruct a DMA unit (e.g., DMA unit 108 of FIG. 1A) to load instructions and data from host memory (e.g., host memory 104 of FIG. 1A) into a global memory. The loaded instructions may then be distributed to each core (e.g., core 1024 of FIG. 1A) assigned with the corresponding task, and the one or more cores may process these instructions.

It is appreciated that the first few instructions received by the core may instruct the core to load/store data from the global memory into one or more local memories of the core (e.g., a memory of the core or a local memory for each active core). Each core may then initiate the instruction pipeline, which involves fetching the instruction (e.g., via a fetch unit) from the local memory, decoding the instruction (e.g., via an instruction decoder) and generating local memory addresses (e.g., corresponding to an operand), reading the source data, executing or loading/storing operations, and then writing back results.

Host CPU 1008 may be associated with host memory 1010 and disk 1012. In some embodiments, host memory 1010 may be an integral memory or an external memory associated with host CPU 1008. Host memory 1010 may be a local or a global memory. In some embodiments, disk 1012 may comprise an external memory configured to provide additional memory for host CPU 1008.

Figure 2:
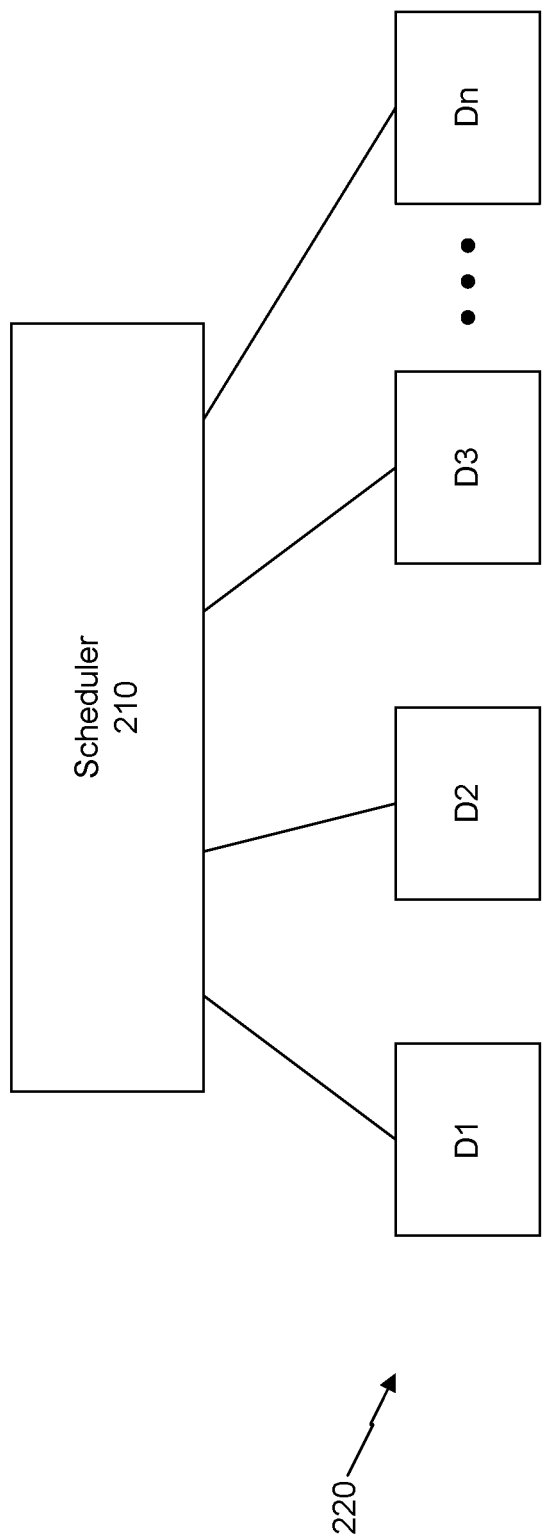
FIG. 2 illustrates an exemplary computing system having a heterogeneous platform, consistent with embodiments of the present disclosure.

FIG. 2 illustrates an exemplary computing system 200 having a heterogeneous platform, consistent with embodiments of the present disclosure. Computing system 200 includes a scheduler 210 and heterogeneous computing resources 220. In some embodiments, the heterogeneous computing resources 220 may include a plurality of target devices D1 to Dn. In some embodiments, the heterogeneous computing resources 220 may include one target device in which processing elements do not have equal processing performance. Scheduler 210 is configured to schedule tasks with respect to execution order of operations and which operation is processed in which target device or which operation is processed in which processing element. In some embodiments of the present disclosure, scheduler 210 may be any form including, but not limited to, executable instructions stored in a computer readable medium for use by or in connection with a computing device including one or more processors. In some embodiments, scheduler 210 may be implemented as logic and/or circuitry configured to perform operations of the executable instructions. In some embodiments, scheduler 210 may be implemented within a compiler. In some embodiments, scheduler 210 may be implemented in runtime libraries.

Heterogeneous computing resources 220 may include a plurality of target devices D1 to Dn that may not have equal processing performance. In some embodiments, at least two of the plurality of target devices D1 to Dn may have different architecture with each other. In some embodiments, target devices D1 to Dn can be implemented as any one of CPU, GPU, FPGA, ASIC, etc. In some embodiments, at least two of the plurality of target devices D1 to Dn may have different processing speeds, power consumptions, transfer costs, etc. In some embodiments, a certain target device may be configured to be specialized to process a certain operation with high performance such as low cost and high accuracy. In some embodiments, the target devices D1 to Dn can be accelerators having, for example, the accelerator architecture 100 of FIG. 1A.

Execution performance of a computing system 200 having a heterogeneous platform, for example, shown in FIG. 2 can be improved by identifying optimal target devices for executing corresponding operations as well as by optimizing an execution order of operations. In some embodiments of the present invention, scheduler 210 is configured to provide optimized mapping between tasks of a computation graph and target devices included in heterogeneous computing resources 220, which will be described in detail referring to FIG. 3 to FIG. 6. In some embodiments, the optimal mapping may include processing element mapping for executing the operations in one target device.

Figure 3:
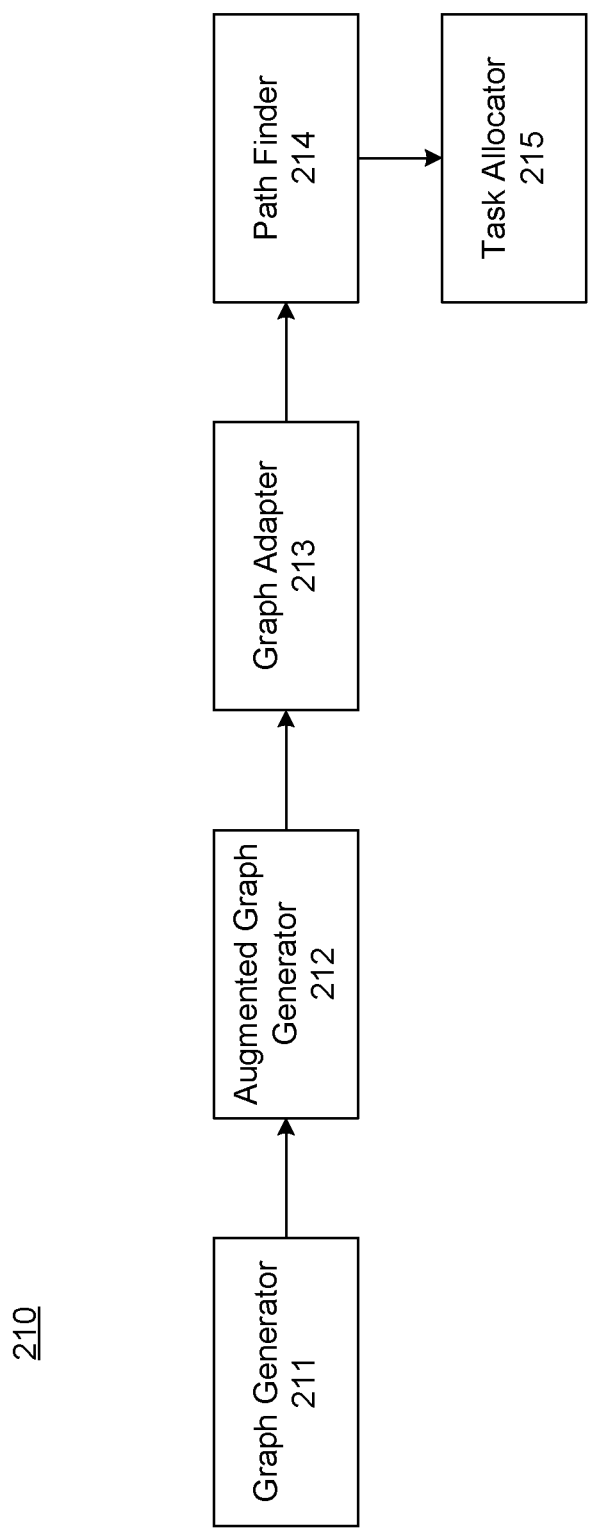
FIG. 3 illustrates a block diagram of exemplary components of a scheduler, consistent with embodiments of the present disclosure.

FIG. 3 illustrates a block diagram of exemplary components of a scheduler 210, consistent with embodiments of the present disclosure. As shown in FIG. 3, scheduler 210 can include a graph generator 211, an augmented graph generator 212, a graph adapter 213, a path finder 214, and a task allocator 215.

Graph generator 211 can compile a source code for a machine-learning model or neural network model to generate a computation graph representing the source code. In some embodiments, graph generator 211 may transform a machine-learning model or neural network model written in high level language to generate a computation graph representing the machine-learning model or neural network model. In some embodiments, the computation graph can be generated from another high-level code initially compiled from the source code. In some embodiments, the machine-learning model may be a trained frozen machine-learning model. In some embodiments, the graph generator 211 can generate a computation graph in a form of a Directed Acyclic Graph (DAG) by parsing a machine-learning model. Nodes represent variables, weights, or computation operations, while edges represent data or tensor flowing from one node to another. An incoming edge to a node representing a computation operation is input data consumed by the computation operation, while an outgoing edge from the node represents output data produced by the computation operation.

Figure 4:
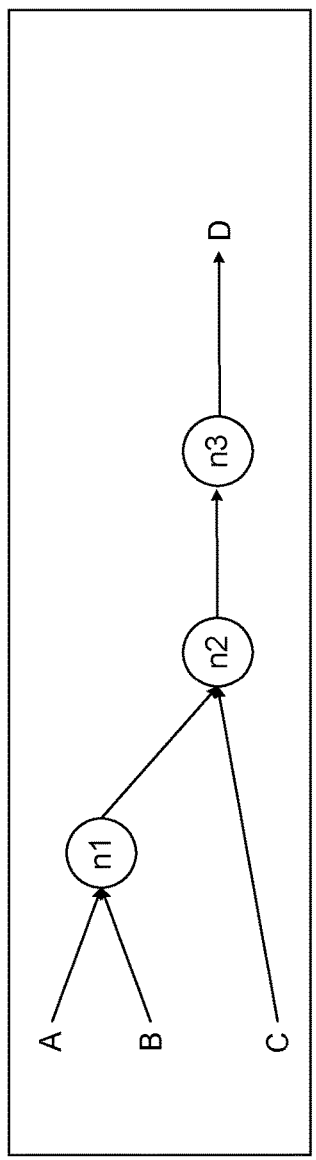
FIG. 4 illustrates an example for computation graph generation, augmentation, and adaptation, consistent with embodiments of the present disclosure.
Figure 4:
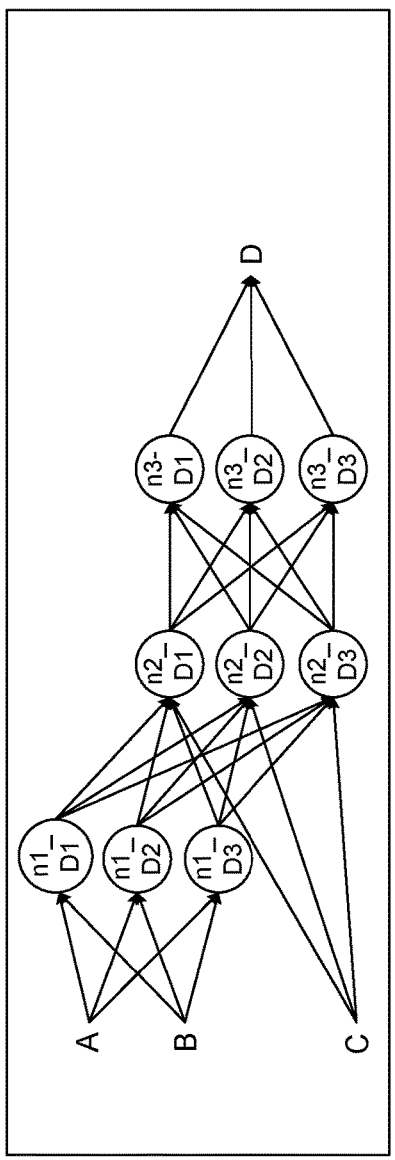
Figure 4:
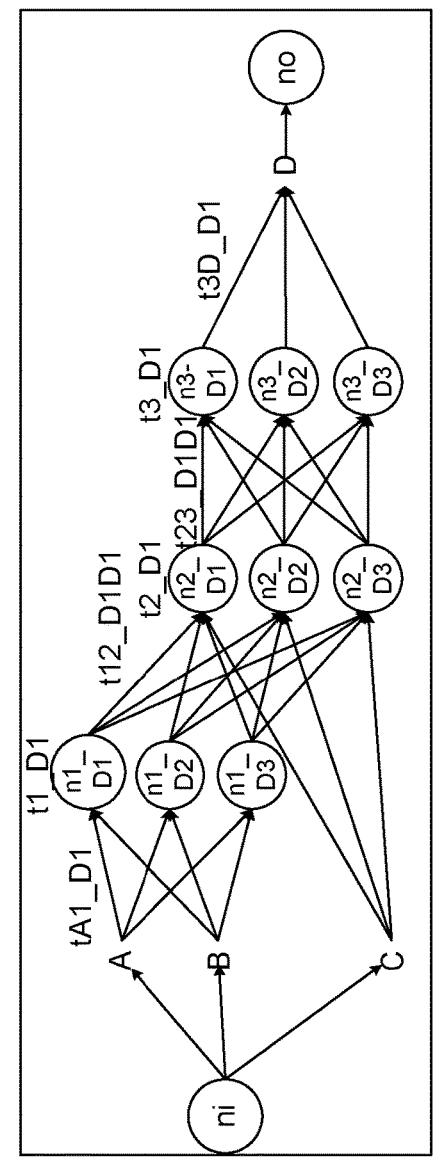

An example of a computation graph generated by the graph generator 211 is illustrated as state 401 in FIG. 4. As shown at state 401, a computation graph includes a plurality of nodes n1 to n3 and edges connecting two nodes among the plurality of nodes n0 to n3. Also at state 401, edges connect input data "A," "B," and "C" to corresponding nodes n1 and n2. In some embodiments, a first node n1 receives input data "A" and "B" as inputs and its output is provided to a second node n2. In turn, the second node n2 receives the output of the first node n1 and input data "C" as inputs and its output is provided to a third node n3. The third node n3 receives the output of the second node n2 as an input and outputs output data "D." In some embodiments, any number of nodes and edges can be included in a computation graph. In some embodiments, some nodes n1 to n3 can include information such as a type of operation, dimensions of data structure, input node(s), output node(s), etc. Here, the operation may include a convolution (Cony), ReLU, multiplication (MatrixMul), etc. In some embodiments, some other nodes may be non-operational nodes and can include weights and other parameters such as constants. In some embodiments, any of input data "A," "B," or "C" or output data "D" can be treated as a node. Edges can represent dependency between two nodes connected by the corresponding edge. That is, a node at the end point of the edge can be processed only after a node at the start point of the edge is processed. For example, a second node n2 can be processed only after a first node n1 is processed and the output of the first node 1 is provided to the second node n2.

In some embodiments, a scheduler 210 can acquire a computation graph from other device or memory. In these embodiments, a scheduler 210 may not include a graph generator 211. For example, the scheduler 210 can obtain a computation graph from a memory storing a compiled computation graph or receive a computation graph from a compiler that is implemented separately from the scheduler 210. In some embodiments, an augmented graph generator 212 may receive a computation graph from external components.

Referring back to FIG. 3, augmented graph generator 212 is configured to generate an augmented computation graph for a computation graph, for example, generated by the graph generator 211, consistent with embodiments of the present disclosure. In an augmented computation graph, a plurality of replica nodes for nodes of a computation graph can be included, consistent with embodiments of the present disclosure.

An example of an augmented computation graph generated by the augmented graph generator 212 based on a computation graph of state 401 is illustrated as state 402 in FIG. 4. As shown in FIG. 4, each node of the computation graph at state 401 has three replica nodes in the augmented computation graph at state 402. In this example, heterogeneous computing resources 220 includes three target devices D1 to D3 and each of nodes n1 to n3 can be mapped onto theses three target devices D1 to D3. It is illustrated at state 402 that the augmented computation graph includes a first set of replica nodes n1_D1 to n1_D3 corresponding to a first node n1 in the computation graph at state 401. At state 402, a replica node n1_D1 represents a case where a first node n1 is mapped to a first target device D1, a replica node n1_D2 represents a case where a first node n1 is mapped to a second target device D2, and a replica node n1_D3 represents a case where a first node n1 is mapped to a third target device D3.

Similarly, the augmented computation graph can include a second set of replica nodes n2_D1 to n2_D3 corresponding to a second node n2 in the computation graph at state 401, and a third set of replica nodes n3_D1 to n3_D3 corresponding to a third node n3. In the augmented computation graph at state 402, each replica node n1_D1, n1_D2, and n1_D3 for a first node n1 is connected through an edge to each replica node n2_D1, n2_D2, and n2_D3 for a second node n2 according to dependency between the first node n1 and second node n2 in the computation graph at state 401. Similarly, each replica node n2_D1, n2_D2, and n2_D3 of a second node n2 is connected through an edge to each replica node n3_D1, n3_D2, and n3_D3 of a third node n3. Input data "A" and "B" is provided to each replica node n1_D1, n1_D2, and n1_D3 of a first node n1. Input data "C" is provided to each replica node n2_D1, n2_D2, and n2_D3 of a second node n2. Each replica node n3_D1, n3_D2, and n3_D3 of a third node n3 is connected through an edge to output data "D."

In some embodiments, a number of the replica nodes in each of the first set, second set, and third set can correspond to a total number of target devices included in the heterogeneous computing resources 220. In some embodiments, the number of the replica nodes in each set can be smaller than the total number of the target devices available in the heterogeneous computing resources 220 because some of the target devices can be predetermined as being improper or inefficient for executing certain computations based on prior history of execution, experiments, or simulations. In some embodiments, some of the target devices can be predetermined as being proper for executing certain tasks or operations, and thus it is possible to exclude the rest of the target devices when augmenting the computation graph. Complexity for finding an optimal path, which is performed by a path finder 214 and will be explained later, can be lowered by reducing replica nodes in the augmented computation graph.

As illustrated at state 402 in FIG. 4, an augmented computation graph can show all possible combinations of mapping between nodes in the computation graph at state 401 and available target device in the heterogeneous computing resources 220 of a computing system 200.

Referring back to FIG. 3, graph adapter 213 is configured to adapt an augmented computation graph generated by the augmented graph generator 212, consistent with embodiments of the present disclosure. In some embodiments, an augmented computation graph can be adapted to include performance values for edges and replica nodes included in the augmented computation graph. In some embodiments, the graph adapter 213 can make the augmented computation graph ready to be used for finding an optimal path by a path finder 214.

In some embodiments, an edge and a node of the augmented computation graph can be labelled with corresponding performance value by the graph adapter 213. In some embodiments, the performance value can be execution time information for processing tasks corresponding to the edge or node. In some embodiments, the execution time for an edge can be a data transfer time and the execution time for a node can be a time for executing certain operations represented by a node. The execution time for an operation or a group of operations can be estimated by statically modelling the cost, dynamically profiling the cost from execution experiments or simulations, or using execution history records based on the sizes of data structures, operation type, computing throughput, or memory bandwidth of the system. Similarly, the data transfer time can be estimated, for example, based on the size of data structures, link bandwidth, and so on. In some embodiments, the data transfer cost on the edge can be estimated by modelling the cost from execution experiments or simulations taking into consideration possible costs such as on-chip buffer reuse rate, data layout, and pipelining.

In some embodiments, the performance value can be power consumption information for processing tasks corresponding to the edge or node. In some embodiments, the performance value can be information representing other system performance such as memory usage efficiency. In some embodiments, the performance value can represent multiple factors including the execution time, power consumption, and memory usage efficiency, etc. For example, the performance value can be determined based on a combined value of the weighted factors. Here, the weights of the multiple factors can be set different from each other. According to embodiments of the present disclosure, scheduling can be performed to optimize various performance factors individually or integrally.

Figure 5:
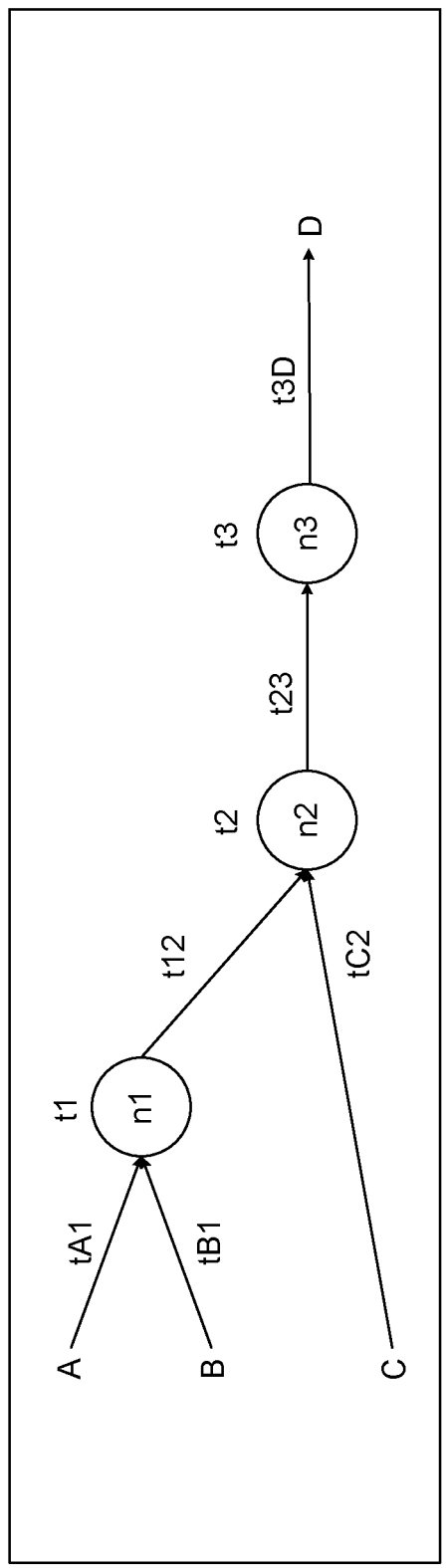
FIG. 5 illustrates an example of cost labelling on a computation graph, consistent with embodiments of the present disclosure.

Now referring to FIG. 5, an example of cost labelling on a computation graph will be explained. For simplicity and illustration purposes, it is assumed that each node is executed by one target device (e.g., D1) and a performance value is a cost for processing certain tasks corresponding to an edge or node in FIG. 5. As shown as state 501 in FIG. 5, nodes and edges are labelled with corresponding costs. An edge between input data "A" and a first node n1 is labelled with a cost tA1 representing a cost of data transfer. In some embodiments, the cost tA1 for data transfer can be a time for transferring input data "A" from a host CPU memory to on-chip memory space of a target device executing the first node n1. A first node n1 is labelled with a cost t1 representing the cost for executing the first node n1. In some embodiments, the cost t1 can be a time for executing the first node n1 at a designated target device. An edge between a first node n1 and second node n2 is labelled with a cost t12 representing the cost of data transfer. In some embodiments, the cost t12 for data transfer can be a time for transferring output of the first node n1 from on-chip memory space for executing the first node n1 to on-chip memory space for executing the second node n2. The test of the edges and nodes can be labelled with their corresponding costs in FIG. 5 in a similar manner.

Referring back to FIG. 4, edges and replica nodes of the augmented computation graph at state 402 can be similarly labelled by graph adapter 213 of FIG. 3, consistent with embodiments of the present disclosure. An example of an augmented computation graph with costs is illustrated as state 403 in FIG. 4. An edge between input data "A" and a replica node n1_D1 is labelled with a cost tA1_D1 representing the cost of data transfer. In some embodiments, the cost tA1_D1 for data transfer can be a time for transferring input data "A" from a host CPU memory to on-chip memory space of a target device D1 executing the first node n1. A replica node n1_D1 is labelled with a cost t1_D1 representing the cost for executing the first node n1 at a target device D1. In some embodiments, the cost t1_D1 can be the time for executing the first node n1 by the target device D1. An edge between replica nodes n1_D1 and n2_D1 is labelled with a cost t12_D1D1 representing the cost of data transfer. In some embodiments, the cost t12_D1D1 for data transfer can be a time for transferring output of the first node n1 from on-chip memory space of the target device D1 for executing the first node n1 to on-chip memory space of the target device D1 for executing the second node n2. A replica node n1_D2 is labelled with a cost t1_D2 (not shown) representing the cost for executing the first node n1 at a target device D2. In some embodiments, the cost t1_D2 can be a time for executing the first node n1 by the target device D2. An edge between replica nodes n1_D1 and n2_D2 can be labelled with a cost t12_D1D2 (not shown) representing the cost of data transfer. In some embodiments, the cost t12_D1D2 for data transfer can be a time for transferring output of the first node n1 from on-chip memory space of the target device D1 for executing the first node n1 to on-chip memory space of a target device D2 for executing the second node n2. The rest of the edges and nodes can be labelled with their corresponding costs in FIG. 4 in a similar manner, which are omitted in FIG. 4 for simplicity.

In some embodiments, graph adapter 213 can be further configured to add two additional nodes to the augmented computation graph. As shown in FIG. 4, an initial node ni is added at the front end of the augmented computation graph and a final node no is added at the end of the augmented computation graph. Here, the two nodes ni and no can be added to facilitate finding an optimal path performed by a path finder 214. Therefore, in some embodiments, edges from an initial node ni to input data "A," "B," and "C" and edges from output data "D" to a final node no can be labelled minimum costs or zero costs.

Referring back to FIG. 3, path finder 214 is configured to determine a path across the adapted computation graph at state 403 of FIG. 4, consistent with embodiments of the present disclosure. Because the adapted computation graph can include costs for all possible mapping between nodes and available target devices as shown at state 403 of FIG. 4, the path finder 214 can determine a path, for example by finding a shortest path from the initial node ni to the final node no. Here, the shortest path can be configurable depending on the goals of the system and can represent a path having a minimum cost or a maximum performance, among paths found in the adapted computation graph. For example, path finder 214 can find a path with the lowest cost among multiple paths from the initial node ni to final node no. A path can be defined by nodes and edges included in the adapted computation graph.

For example, a total cost C1 of a path P1 passing through a replica node n1_D1 from a first set, a replica node n2_D1 from a second set, and a replica node n3_D1 from a third set can be determined by adding all the costs along the edges and nodes of the path P1 from the initial node n1 to the final node no. Here, the path P1 represents a case where all three nodes n1, n2, and n3 are executed at a target device D1. The total cost C1 of the path P1 can be a sum of costs tA1_D1, t1_D1, t12_D1D1, t2_D1, t23_D1D1, t3_D1, and t3D_D1. A total cost C2 of a path P2 where two nodes n1 and n2 are executed at a target device D1 and one node n3 is executed at a target device D2 can be a sum of costs tA1_D1, t1_D1, t12_D1D1, t2_D1, t23_D1D2, t3_D2, and t3D_D2. In a similar manner, the path finder 214 can determine total costs for other possible paths from the initial node ni to the final node no. In some embodiments, the path finder 214 can determine a path having a smallest total cost or maximum performance value among the multiple paths as the shortest path. In some embodiments, shortest path finding techniques such as Dijkstra's algorithm can be used to determine a shortest path from an initial node ni to a final node no in the adapted computation graph by the optimal path finder 214.

In some embodiments, when determining a total cost of a path in the adapted computation graph, path finder 214 can consider constraints such as dependency conditions of the computation graph. Referring back to FIG. 5, it is noted that a first node n1 cannot be executed until both of input data "A" and "B" are received. In a case that the cost represents a time for executing certain tasks or operations, an edge labelled with a cost tA1 and an edge labelled with a cost tB1 can be treated as one edge labelled with a bigger cost between the two costs tA1 and tB1 when finding an optimal path. Similarly, a second node n2 can be executed after both of the output of the first node n1 and input data "C" are received. Therefore, when determining a total cost for executing the computation graph, a bigger cost between a cost along a first path from input data "A" and "B" to a second node n2 through a first node n1 and a cost along a second path from the input data "C" to a second node n2 can be considered. If the cost tA1 is bigger than the cost tB1, a sum of the cost tA1 and the cost t12 can be determined as the cost along the first path. In this example, a total cost for executing the computation graph can be determined by adding a cost t23, a cost t3D, and a bigger cost between a cost tC2 and the sum of the costs tA1 and t12. Consistent with embodiments of the present disclosure, path finder 214 can determine costs for paths in the augmented computation graph in a similar manner by considering constraints such as dependency conditions of the computation graph.

Figure 6:
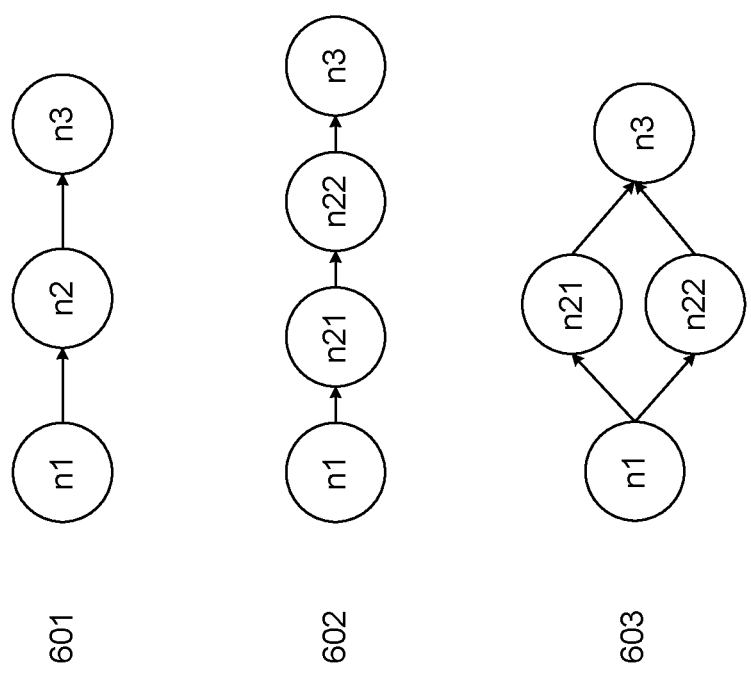
FIG. 6 illustrates an example of node decomposition in a computation graph, consistent with embodiments of the present disclosure.

It is appreciated that embodiments of the present disclosure can be applied after decomposing a node in the computation graph into a plurality of sub-nodes. Referring to FIG. 6, node decomposition will be explained. When allocating tasks of computation graphs on target devices, a node can be decomposed into sub-nodes to find an optimal fit into computation granularity of a certain target device, consistent with embodiments of the present disclosure. In FIG. 6, a part of a computation graph of state 401 in FIG. 4 is shown at state 601 and two different types of decomposition therefrom are shown at states 602 and 603. In state 602, a second node n2 from a computation graph at state 601 is decomposed into two sub-nodes n21 and n22 in series. In state 603, a second node n2 from a computation graph at state 601 is decomposed into two sub-nodes n21 and n22 in parallel. In some embodiments, at least one node of a computation graph at state 401 can be a sub-node of a bigger node. Similarly, at least one node of a computation graph at state 401 can be a fused node of two or more nodes. The process finding an optimal mapping between target devices and nodes can be performed based on a computation graph including at least one sub-node or a fused node, consistent with embodiments of the present disclosure.

When a computation graph has multiple paths between two nodes, each path of the multiple paths can be handled separately in determining optimal device mapping according to embodiments of the present disclosure. For example, as shown at state 603 in FIG. 6, there are two paths between a first node n1 and a third node n3. A first path is through a first sub-node n21 and a second path is through a second sub-node n22. In some embodiments, when determining a total cost of a path in the adapted computation graph, path finder 214 can avoid device conflict between these multiple paths in order to maximize computation parallelization in the heterogeneous computing system. For example, when determining an optimal path, scenarios involving assignment of both the first sub-node n21 and the second sub-node n22 to a same target device can be avoided. If both of the two sub-nodes n21 and n22 are assigned to a first target device D1 and the two sub-nodes n21 and n22 are executed in a consecutive order rather than in parallel, the cost between a first node n1 and a third node n3 will increase. This is because a third node n3 cannot be executed until both outputs from a first sub-node n21 and a second sub-node n22 are received.

If both of the two sub-nodes n21 and n22 are assigned to a first target device D1 and the two sub-nodes n21 and n22 can be executed on distinct processing elements in parallel, it is understood that there is no device conflict among these multiple paths. In a case that a cost between two nodes n1 and n3 is minimized when two sub-nodes n21 and n22 are assigned to a same target device, the two sub-nodes n21 and n22 can be fused into one node as shown at state 601 in FIG. 6. Node fusing can be applied to two or more distinct nodes as well as sub-nodes of one node when determining an optimal device mapping in heterogeneous platform, consistent with embodiments of the present disclosure. In some embodiments, the node fusing process can be iterated until multiple paths between two nodes can be removed. In this way, complexity for determining an optimal path can be reduced by simplifying the computation graph or augmented computation graph. The decomposing and fusing process can, also, improve execution performance of a computing system having heterogeneous platform by allowing task allocation fitting into computation granularity of target devices through a hardware-software co-design or hardware exploration.

Referring back to FIG. 3, task allocator 215 is configured to map tasks on target devices based on the optimal path determined by the path finder 214, consistent with embodiments of the present disclosure. For example, if the path finder 214 determines a path through a replica node n1_D1, a replica node n2_D2, and a replica node n3_D3 as an optimal path in the adapted computation graph, the task allocator 215 can allocate tasks of a computation graph at state 401 in FIG. 4 on target devices accordingly. In this example, the task allocator 215 can map a first node n1 to a target device D1, a second node n2 to a target device D2, and a third node to a target device D3.

Figure 7:
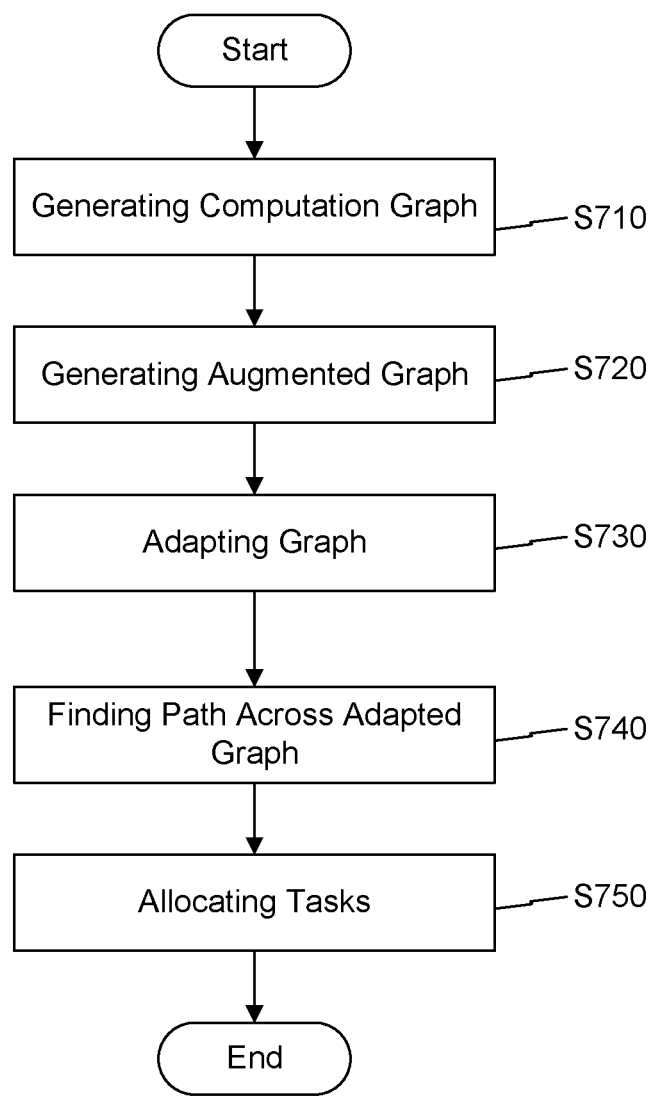
FIG. 7 illustrates an exemplary flow diagram for scheduling a computation graph on heterogeneous computing resources, consistent with embodiments of the present disclosure.

FIG. 7 illustrates an exemplary flow diagram for scheduling a computation graph on heterogeneous computing resource, consistent with embodiments of the present disclosure. At step S710, a computation graph representing a source code for a machine-learning model is generated. For example, as shown in state 401 of FIG. 4, the generated computation graph may include a plurality of nodes and edges and be in a form of a Directed Acyclic Graph (DAG).

At step S720, the generated computation graph can be augmented, consistent with embodiments of the present disclosure. In an augmented computation graph, a plurality of replica nodes for nodes of a computation graph can be included, consistent with embodiments of the present disclosure. An example of an augmented computation graph generated by the augmented graph generator 212 based on a computation graph of state 401 is illustrated as state 402 in FIG. 4. As shown in FIG. 4, each node of the computation graph at state 401 has three replica nodes in the augmented computation graph at state 402. In this example, heterogeneous computing resources 220 include three target devices D1 to D3, and each of nodes n1 to n3 can be mapped onto theses three target devices D1 to D3. In some embodiments, a number of the replica nodes in each of the first set, second set, and third set can correspond to a total number of target devices included in the heterogeneous computing resources 220.

In some embodiments, the number of the replica nodes in each set can be smaller than the total number of the target devices available in the heterogeneous computing resources 220 because some of the target devices can be predetermined as being improper or inefficient for executing certain computations based on prior history of execution, experiments, or simulations. In some embodiments, some of the target devices can be predetermined as being proper for executing certain tasks or operations, and thus it is possible to exclude the rest of the target devices when augmenting the computation graph. Complexity for finding an optimal path can be lowered by reducing replica nodes in the augmented computation graph. As illustrated at state 402 in FIG. 4, an augmented computation graph can show all possible combinations of mapping between nodes in the computation graph at state 401 and available target device in the heterogeneous computing resources 220 of a computing system 200.

At step S730, the augmented computation graph can be adapted, consistent with embodiments of the present disclosure. In some embodiments, an augmented computation graph can be adapted to include performance values for edges and replica nodes included in the augmented computation graph. In some embodiments, an edge and a node of the augmented computation graph can be labelled with corresponding performance value. In some embodiments, the performance value can be execution time information for processing tasks corresponding to the edge or node. In some embodiments, the execution time for an edge can be a data transfer time and the execution time for a node can be a time for executing certain operations represented by a node. In some embodiments, the performance value can be power consumption information for processing tasks corresponding to the edge or node. In some embodiments, the performance value can be information representing other system performance such as memory usage efficiency. In some embodiments, the performance value can represent multiple factors including the execution time, power consumption, and memory usage efficiency, etc. For example, the performance value can be determined based on a combined value of the weighted factors. Here, the weights of the multiple factors can be set different from each other.

At step S740, a path across the adapted computation graph (e.g., computation graph at state 403 of FIG. 4) can be determined, consistent with embodiments of the present disclosure. Because the adapted computation graph can include costs for all possible mapping between nodes and available target devices as shown at state 403 of FIG. 4, the path can be determined, for example by finding a shortest path from the initial node n1 to the final node no. Here, the shortest path can represent a path having a minimum cost or a maximum performance, among paths found in the adapted computation graph. In some embodiments, a path with the lowest cost among multiple paths from the initial node ni to final node no can be determined as the shortest path. A path can be defined by nodes and edges included in the adapted computation graph.

In some embodiments, when determining a total cost of a path in the adapted computation graph, constraints such as dependency conditions of the computation graph can be considered. It is also appreciated that embodiments of the present disclosure can be applied after decomposing a node in the computation graph into a plurality of sub-nodes. The process finding an optimal mapping between target devices and nodes can be performed based on a computation graph including at least one sub-node or a fused node, consistent with embodiments of the present disclosure. It is also appreciated that node fusing can be applied to two or more distinct nodes as well as sub-nodes of one node when determining an optimal device mapping in heterogeneous platform, consistent with embodiments of the present disclosure. In some embodiments, a node fusing process can be iterated until multiple paths between two nodes can be removed. In this way, complexity for determining an optimal path can be reduced by simplifying the computation graph or augmented computation graph. The decomposing and fusing process can improve execution performance of a computing system having heterogeneous platform by allowing task allocation fitting into computation granularity of target devices through a hardware-software co-design or hardware exploration.

At step S750, tasks corresponding to nodes of a computation graph can be mapped on target devices based on the optimal path determined at step S740, consistent with embodiments of the present disclosure. For example, if a path through a replica node n1_D1, a replica node n2_D2, and a replica node n3_D3 is determined as an optimal path in the adapted computation graph, the tasks of a computation graph at state 401 in FIG. 4 can be mapped on target devices accordingly. In this example, a first node n1 is assigned to a target device D1, a second node n2 is assigned to a target device D2, and a third node is assigned to a target device D3.

Embodiments of the present disclosure provide methods and techniques for partitioning a computation graph according to computation granularities of heterogeneous accelerators and finding optimal mapping between tasks of the computation graph and target devices to maximize performance of a computing system. According to embodiments of the present disclosure, finding an optimal device mapping problem can be converted to finding an optimal path in the graph by generating an augmented computation graph with potential target devices based on a computation graph. According to embodiments of the present disclosure, edges and nodes in the augmented computation graph can be labelled with corresponding performance values. Embodiments of the present disclosure can be performed offline as well as online using a step-by-step approach explained above referring to FIG. 7.

According to embodiments of the present disclosure, it is possible to optimize device mapping in view of various optimization constraints. For example, the device mapping can be optimized to reduce execution time, to reduce power consumption, or to improve overall performance considering various factors. According to embodiments of the present disclosure, optimal device mapping can be obtained as well as execution parallelism in the heterogeneous accelerator architectures. According to embodiments of the present disclosure, it is also possible to identify optimal computational granularity of an accelerator, which makes the accelerator operate more efficiently in terms of design simplicity or execution performance.

Embodiments herein include database systems, methods, and tangible non-transitory computer-readable media. The methods may be executed, for example, by at least one processor that receives instructions from a tangible non-transitory computer-readable storage medium. Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories and/or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "computer-readable storage medium" should be understood to include tangible items and exclude carrier waves and transient signals.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The invention claimed is:

1. A method for scheduling a computation graph on heterogeneous computing resources, the method comprising:
   generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph;
   adapting the augmented computation graph to include performance values for the edges, the replica nodes of the first set, and the replica nodes of the second set;
   determining a path across the adapted computation graph via one replica node of the first set and one replica node of the second set based on the performance values; and
   allocating target devices in the heterogeneous computing resources for executing an operation of the first node and an operation of the second node according to the determined path.

2. The method of claim 1, wherein a number of the replica nodes in the first set corresponds to a number of potential target devices for executing an operation of the first node in the heterogeneous computing resources.

3. The method of claim 2, wherein the potential target devices are selected from a plurality of target devices in the heterogeneous computing resources.

4. The method of claim 2, wherein each of the replica nodes in the first set represents that the operation of the first node is assigned to corresponding each of the potential target devices.

5. The method of claim 1, wherein the performance values include a data transfer time corresponding to an edge among the edges and an execution time corresponding to a replica node among the replica nodes of the first set.

6. The method of claim 1, wherein the adapted computation graph includes an initial node and a final node that are added to a front end and an end of the augmented computation graph when adapting the augmented computation graph.

7. The method of claim 1, wherein the path is determined based on comparison of sums of performance values along possible paths across the adapted computation graph.

8. The method of claim 1, wherein a target device corresponding to the one replica node of the first set is assigned for executing the operation of the first node and a target device corresponding to the one replica node of the second set is assigned for executing the operation of the second node.

9. An apparatus for scheduling a computation graph on heterogeneous computing resources, the apparatus comprising:
a memory storing a set of instructions; and
one or more processors configured to execute the set of instructions to cause the apparatus to perform:
generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph;
adapting the augmented computation graph to include performance values for the edges, the replica nodes of the first set, and the replica nodes of the second set;
determining a path across the adapted computation graph via one replica node of the first set and one replica node of the second set based on the performance values; and
allocating target devices in the heterogeneous computing resources for executing an operation of the first node and an operation of the second node according to the determined path.

10. The apparatus of claim 9, wherein a number of the replica nodes in the first set corresponds to a number of potential target devices for executing an operation of the first node in the heterogeneous computing resources.

11. The apparatus of claim 10, wherein each of the replica nodes in the first set represents that the operation of the first node is assigned to corresponding each of the potential target devices.

12. The apparatus of claim 9, wherein the performance values include a data transfer time corresponding to an edge among the edges and an execution time corresponding to a replica node among the replica nodes of the first set.

13. The apparatus of claim 9, wherein the adapted computation graph includes an initial node and a final node that are added to a front end and an end of the augmented computation graph when adapting the augmented computation graph.

14. The apparatus of claim 9, wherein the path is determined based on comparison of sums of performance values along possible paths across the adapted computation graph.

15. A non-transitory computer readable medium that stores a set of instructions that is executable by at least one processor of a computing device to cause the computing device to perform a method for scheduling a computation graph on heterogeneous computing resources, the method comprising:
generating an augmented computation graph that includes a first set of replica nodes corresponding to a first node in the computation graph and a second set of replica nodes corresponding to a second node in the computation graph, wherein the replica nodes of the first set are connected by edges to the replica nodes of the second set according to dependency between the first node and the second node in the computation graph;
adapting the augmented computation graph to include performance values for the edges, the replica nodes of the first set, and the replica nodes of the second set;
determining a path across the adapted computation graph via one replica node of the first set and one replica node of the second set based on the performance values; and
allocating target devices in the heterogeneous computing resources for executing an operation of the first node and an operation of the second node according to the determined path.

16. The computer readable medium of claim 15, wherein a number of the replica nodes in the first set corresponds to a number of potential target devices for executing an operation of the first node in the heterogeneous computing resources.

17. The computer readable medium of claim 15, wherein the adapted computation graph includes an initial node and a final node that are added to a front end and an end of the augmented computation graph when adapting the augmented computation graph.

* * * * *